(12) United States Patent
Lee et al.

(10) Patent No.: US 8,263,288 B2
(45) Date of Patent: Sep. 11, 2012

(54) RAPID START-UP, AUXILIARY POWER, AND AIR PREHEATING DEVICE OF HIGH TEMPERATURE FUEL CELL SYSTEMS

(75) Inventors: Shu-Feng Lee, Hsinchu (TW); Che-Wun Hong, Hsinchu (TW); Chin-Hsien Cheng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 781 days.

(21) Appl. No.: 12/396,594

(22) Filed: Mar. 3, 2009

(65) Prior Publication Data

US 2009/0246583 A1 Oct. 1, 2009

(30) Foreign Application Priority Data

Mar. 28, 2008 (TW) .............................. 97111145 A

(51) Int. Cl.
*H01M 8/04* (2006.01)
*H01M 8/10* (2006.01)

(52) U.S. Cl. ........ 429/495; 429/429; 429/433; 429/434; 429/441

(58) Field of Classification Search ................. 429/429, 429/433, 434, 441, 495
See application file for complete search history.

(56) References Cited

U.S. PATENT DOCUMENTS

2007/0190381 A1* 8/2007 Horiuchi et al. ............... 429/26
* cited by examiner

*Primary Examiner* — Eugenia Wang

(57) ABSTRACT

This invention relates to a rapid start-up, auxiliary power, and air preheating device of high temperature fuel cell systems, which comprise of a metal sheet, metal mesh plates, insulated ceramic rings and a direct flame SOFC (solid oxide fuel cell) positive electrolyte negative assembly (PEN). The metal mesh plates are used to substitute the electrode plates to collect the current. The ribs between the PEN and the metal mesh plates are also for collecting current, while the ceramic ring is an insulator. This device is able to pre-heat gas rapidly and generates power at the same time, it's costless, easy to assemble, rapid start-up, high electric conductivity, excellent sealing and etc. In addition, it can heat up the fuel cell stack rapidly and start up the system without lag.

8 Claims, 5 Drawing Sheets

RAPID START-UP, AUXILIARY POWER, AND AIR PREHEATING DEVICE OF HIGH TEMPERATURE FUEL CELL SYSTEMS

CROSS-REFERENCE TO RELATED APPLICATION

This application claims foreign priority from a Taiwan Patent Application, Ser. No. 097111145, filed on Mar. 28, 2008.

BACKGROUND OF THE INVENTION

1. Field of the Invention

The present invention generally relates to a rapid start-up, auxiliary power, and air preheating device of high temperature fuel cell systems, and more particularly to a device having a heat exchanger for preheating air or a front-end system of an integrated reformer in a high temperature fuel cell system for heat a gas entering the reformer, while generating an auxiliary power to drive the electric device in the system, and the device can process the remaining gases introduced into a fuel cell stack for a post-combustion, and it is a rapid start-up, auxiliary power and air preheating device, wherein the direct combustion solid oxide fuel cell in the device can generate electric power instantaneously by a flame combustion of a hydrogen-rich fuel. The device of the invention can be installed in another waste gas post-combustion system to serve as an additional auxiliary power source.

2. Description of the Related Art

In recent years, governments and private sectors of different countries invest tremendous manpower and capitals for the research and development of fuel cell technologies. Since fuel cells are energy converting devices with high efficiency and low pollution, and whose anode supplies a fuel and whose cathode supplies an oxidizing agent, therefore chemical energy can be converted into electric energy by an electrochemical reaction directly. The solid oxide fuel cell conducts oxygen ions through a solid electrolyte for an electrochemical reaction to generate electric energy and operates together with a thermal turbine system to provide the advantages of a high energy conversion efficiency, a low discharge of polluted gases, and diversified applications of the fuel.

The preliminary objective of the research and development of solid oxide fuel cell systems is to supply electric energy for an electric generator in a power plant at a fixed location. In the development process of the solid oxide fuel cell systems, there are various different designs of cell stacks, and three of the common designs of the electrolyte of high-temperature fuel cells are tubular, planar and molten designs. Oxygen ions are transmitted quickly in the electrolyte at a high temperature, and the output power density is large, and thus there is no flooding phenomenon of the low-temperature cell. However, it is necessary to overcome two issues to achieve the practical applications of the planar solid oxide fuel cell. Firstly, it takes a long start-up lag for the high temperature fuel cell systems to reach a specific working temperature range. Secondly, a cell stack has two major problems, respectively metal fatigue and thermal cracking when the high-temperature fuel cell is operated at a high temperature.

In the present high temperature fuel cell systems, the ambient temperature of the whole system is approximately equal to 40~950° C., and thus insulating cotton and insulating ceramic can be used for isolating two areas, wherein one area refers to the high-temperature module having high ambient temperature and including one high-temperature fuel cell module, one gas divided pipe, and one heat exchanger or one integrated reformer for preheating air, and an energy recycle unit, and another area refers to the support module which is a part of the system control and gas and combustion input, having one high-performance fan, one control panel (fuel input end and power output end), one control system unit and one power inverter.

In general, a high temperature fuel cell system usually use a heat exchanger or an integrated reformer for preheating air, and a thermal couple component for driving, and whose electric power source is coupled to a fuel cell or an additional power supply system for heating fuels and gases entering into the cell. R.O.C. Pat. No. M323119 has disclosed such technology, but an additional power source is required, no matter how high is the thermal conversion efficiency. If it is necessary to increase the system temperature quickly, the power consumption is also increased, and thus the prior art not only consumes much time, but also lowers the overall performance of the fuel cell generation system.

To overcome the issue of operating a high temperature fuel cell at a high temperature for a long time that causes a thermal stress and a possible crack of the cell stack, R.O.C. Pat. Nos. M281305 and M273828 disclose an improved design of using a channel structure of a connecting plate and a stopping block to overcome the cracking issue of a cell stack. In addition, a composite electroplating method or a newly developed cell materials, cells or protecting films as disclosed in R.O.C. Pat. Nos. I2343216, I2343216, I253779, 200603474, and 00591814 are disclosed. However, these patented technologies still cannot prevent the non-uniform temperature distribution effectively and has no significant effect on the quick startup of the fuel cell at all.

The apparatus in accordance with the present invention can be installed at a front-end device of a heat exchanger or an integrated reformer for preheating a gas and having a rapid start-up, auxiliary power and air preheating device, while generating an auxiliary power during the process of heating and combusting the gas and reducing the start-up lag of the high temperature fuel cell system to reach a specific working temperature range, such that the cell stack can achieve the rapid start-up and the working temperature effectively, and provide an additional electric power to improve the system performance. The present invention is novel and there is a need for improving the high temperature fuel cell systems, and thus the inventor of the present invention based on years of experience in the related industry to conduct extensive researches and experiments, and finally simulated and developed a fuel cell system in accordance with the present invention.

SUMMARY OF THE INVENTION

At present, the energy conversion efficiency of high temperature fuel cell systems is higher than other types of fuel cell systems, and thus the high temperature fuel cell is still considered as the fixed fuel cell generation system with the highest potential, and the development of the solid fuel cell generation system is limited to the lag of a cold start and the high temperature of the system. If the fuel cell having the advantages of not occupying much space, having a high heat recycle rate, an excellent sealing effect, a rapid start-up high-performance high temperature fuel cell system can be manufactured with a lower cost, the practicability of the high temperature fuel cell systems can be improved and the green generation device of the fuel cell can be used extensively to reduce pollutions to the environment.

Therefore, the rapid start-up, auxiliary power and air preheating device of the present invention is characterized in that the start-up lag of the high temperature fuel cell systems can be reduced and the auxiliary power can be supplied to other electric equipments in the system, and the stability of the cell temperature can be maintained, and the gas using rate and the system performance of the high temperature fuel cell systems can be enhanced.

The present invention focuses on the metal sheet and the heat-resisting ceramic insulating material and uses a metal sheet welding to stamp the metal sheet into a cylindrical metal framework housing that contains an external casing with a fire collection opening therein, and a ceramic insulating ring and a metal mesh plate are combined with a direct combustion solid oxide fuel cell module to form a rapid start-up, auxiliary power and air preheating device. Therefore, the rapid start-up, auxiliary power and air preheating device has the advantages of low cost, easy-to-make, short system start-up lag, auxiliary power supply, and excellent sealing effects to overcome the problems occurred in the fuel cell industry.

Therefore, it is a primary objective of the present invention to provide a rapid start-up, auxiliary power, and air preheating device of high temperature fuel cell systems, wherein the device comes with the design of a fire collection opening disposed in the device. In addition to the installation of a hydrogen-rich fuel pipeline, the device of the invention also connects a passage of a gas outlet of the cell stack for performing a post combustion for the remaining gas introduced into the cell stack after a reaction takes place, and the exterior of the device of the invention is also coupled to an air passage of a heat exchanger or an integrated reformer for heating the air entering into the fuel cell stack to achieve an air preheating effect. Such device with a gas reuse effect can be used for improving the heat recycle and the gas using rate of the high temperature fuel cell systems.

Another objective of the present invention is to provide a rapid start-up, auxiliary power, and air preheating device of high temperature fuel cell systems, wherein the device uses a film electrode module of a direct combustion solid oxide fuel cell as the electric power supply, and lower metal mesh plates as cathode and anode electrode plates of a cell to lower the manufacturing cost of the cell electrode plates, and a ceramic insulating ring disposed around the periphery of the metal mesh plate for effectively isolating each film electrode module and preventing a short circuit. If it is necessary to have a higher cell power, the number of film electrode modules can be increased directly without the need of manufacturing a large-area film electrode module, so as to lower the manufacturing cost of the film electrode module. If a certain film electrode module is damaged, that particular film electrode module can be examined and replaced, so as to reduce the cost of using the film electrode module.

A further objective of the present invention is to provide a rapid start-up, auxiliary power, and air preheating device of high temperature fuel cell systems, wherein the device includes a metal mesh plate to serve as a cell electrode to lower the manufacturing cost, and uses a cutting manufacture to form an indentation to serve as a flame passage, so that the hydrogen-rich flame is in direct contact with a film electrode module of the direct combustion solid oxide fuel cell to produce an electrochemical reaction directly and generate an electric power effectively. A conducting wire of the metal mesh plate is connected to an external circuit to form and complete a loop, such that the present invention can achieve the effects of improving the cold start issue of the high temperature fuel cell systems, supplying sufficient start-up power for the operation of the high temperature fuel cell systems, and reaching a working temperature, or the device is installed in another waste gas post-combustion system to serve as an additional auxiliary power source.

Another objective of the present invention is to provide a rapid start-up, auxiliary power, and air preheating device of high temperature fuel cell systems, wherein the device uses a metal material responsible for the job of dissipating gases, and includes an insulating cotton disposed on the surface of the exposed part for reducing the radiation of high temperature therein, and providing a good isolation for the reaction temperature.

To make it easier for our examiner to understand the objectives, functions, and advantages of the present invention, preferred embodiments together with accompanied drawings are used for the detailed description of the invention as follows.

DETAILED DESCRIPTION OF THE PREFERRED EMBODIMENTS

Figure 1:
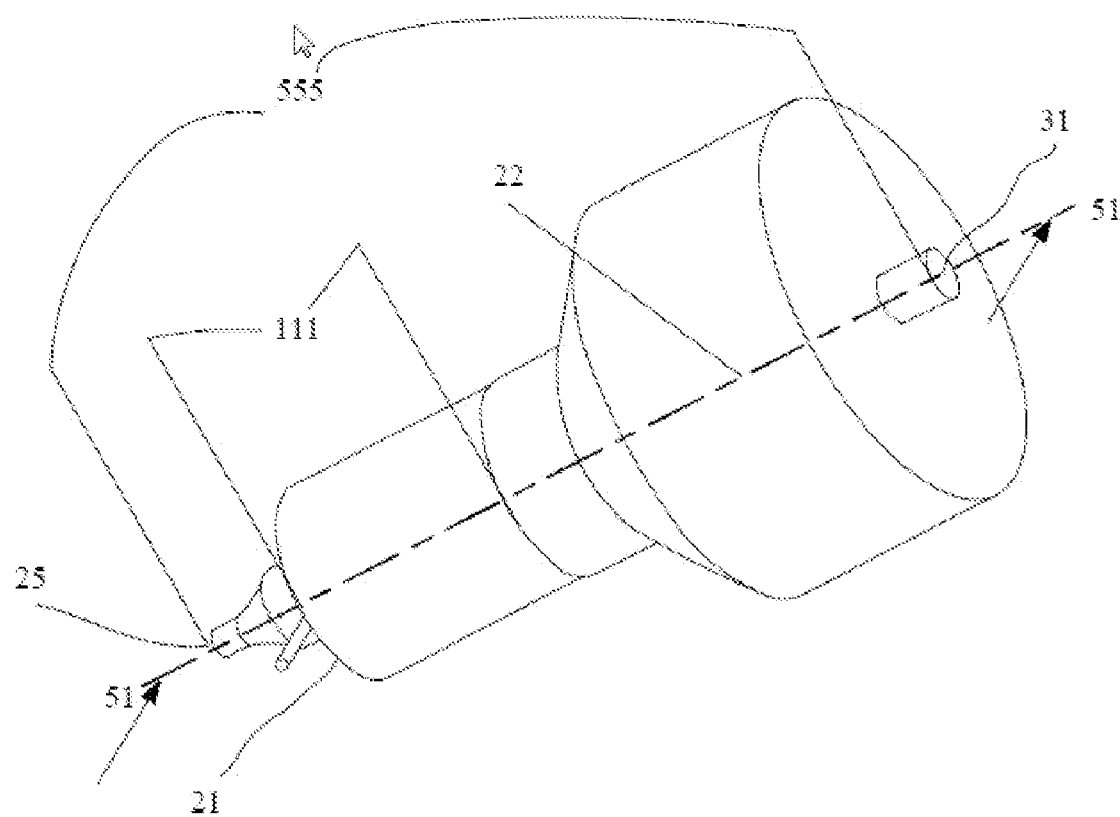
FIG. 1 is a perspective view of a preferred embodiment of the present invention.

With reference to FIG. 1 for a perspective view of a rapid start-up, auxiliary power, and air preheating device of high temperature fuel cell systems in accordance with a preferred embodiment of the present invention, the device is divided into a core area (111) and a peripheral area (555), and the core area (111) includes a plurality of direct combustion solid oxide fuel cells therein, and the peripheral area (555) includes an inlet passage (21) coupled to an air passage of the core area, a high temperature gas outlet passage (31), a hydrogen containing fuel passage (25) and a ventilation chamber (22). In this embodiment of the present invention, the inlet passage is disposed under the device, and the outlet passage is disposed above the device.

Figure 2:
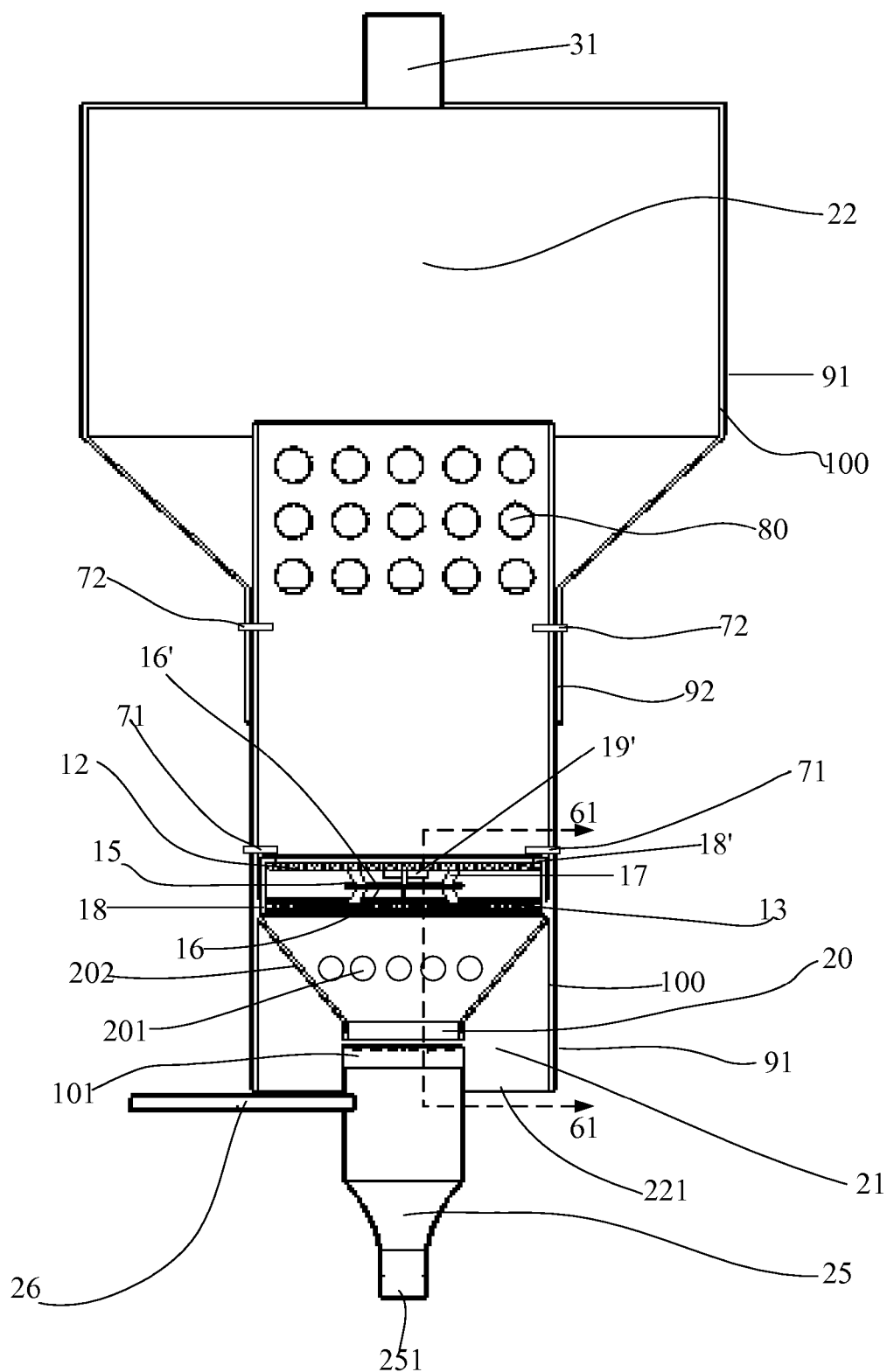
FIG. 2 is a cross-sectional view of Section 51-51 as depicted in FIG. 1.

With reference to FIG. 2 for a cross-sectional view of Section 51-51 as depicted in FIG. 1, an igniter (101) for providing an ignition flame, a fire collection opening peripheral portion (202), a fire collection opening (201), an air inlet passage (21), a hydrogen containing fuel passage (25) and a cell stack reaction remaining air passage (26) are disposed under the ignition opening (20). FIG. 2 shows a fuel incoming hole (251) for supplying a fuel required for a flame combustion, an air passage inlet (221) disposed above the fire collection opening (20) for supplying air. The core area (111) includes an upper metal mesh plate (12), a lower metal mesh plate (13), a film cell module (15) of the direct combustion solid oxide fuel cell, and a lower distal surface of the film cell module in contact with the flame is an anode terminal (16), and an upper distal surface is a cathode terminal (16'), and a current collecting rib contacted with the film cell module for introducing current and an electric wire outlet coupled to an external circuit. In the figure, the electric wire outlet shown in the figure is a cathode circuit outlet terminal (19'), and the electric wire outlet not shown in the figure is an anode circuit outlet terminal. Upper and lower high temperature resisting ceramic insulating rings (18', 18) are disposed around the periphery of the metal mesh plate, and between the metal mesh plate and the air passage for preventing a short circuit. An insulating ring fixed stopping plate (71), a ventilation chamber fixed slippery-resisting plate (72), and a ventilation chamber (22) are disposed above the core area and coupled to an outlet passage (31) of a reformer or a cell stack, and a heat insulating material (91) is contacted and disposed between the air passage and the ventilation chamber. In the figure, the air passage in the ventilation chamber includes an air hole (80). The heat insulating material (91) is covered onto a surface of the exposed part of a metal casing (100). In the device of the present invention, an insulating cotton (92) is disposed at an end of the air passage and contacted with the ventilation chamber (22) for securely integrating the air passage with the ventilation chamber. In this embodiment, a ventilation chamber fixed slippery-resisting plate (72) is used for fixing the ventilation chamber. Of course, a device such as a ring can be used for binding an end of the air passage and the periphery of the ventilation chamber. A common manufacturing method such as plastic molding or compression molding can be used to assure a secured connection of the surface of the exposed part of the metal casing (100) with the heat insulating material (91).

The oxygen required for the operation of the direct combustion solid oxide fuel cell in the core area (111) enters into the core area (111) from the air passage (21), and then into each part of the cathode position (16') of the direct combustion solid oxide fuel cell film cell module (15) through an air dispersion, and the current collecting rib (17) above the cathode electrode is connected to the upper metal mesh plate (12) for transmitting current to an external circuit. The electrode position (16) below the film cell module (15) is in a direct contact with a flame for heating up the film cell module (15) to a normal working temperature. Since the flame is not fully combusted, the hydrogen in the fuel enters directly from the flame into the electrode position (16) to complete the whole electrochemical reaction. As the temperature of the gas around the flame rises, gas products are produced after the reaction and discharged through the high temperature gas outlet passage (31) to the outside. Upper and lower metal mesh plates (12, 13) are disposed between the upper and lower insulating ceramic rings (18', 18) to prevent contacting the metal casing (100), so as to complete the cell working circuit.

The device of the present invention uses the dispersed temperature of a flame combustion to heat the working fluid and generate a power for supplying an auxiliary power to the system and other electric devices (such as an air motor, a blower, or a sensor) to improve the start-up problem of the whole high-temperature fuel cell. With the design of a whole air passage, a high temperature fuel cell system is provided to achieve a working temperature more timely and quickly to improve the overall system performance. Compare with the prior art that simply uses a thermal couple to provide an indirect way of heating the reaction gas, the present invention provides a novel solution to improve over the prior art.

Figure 3:
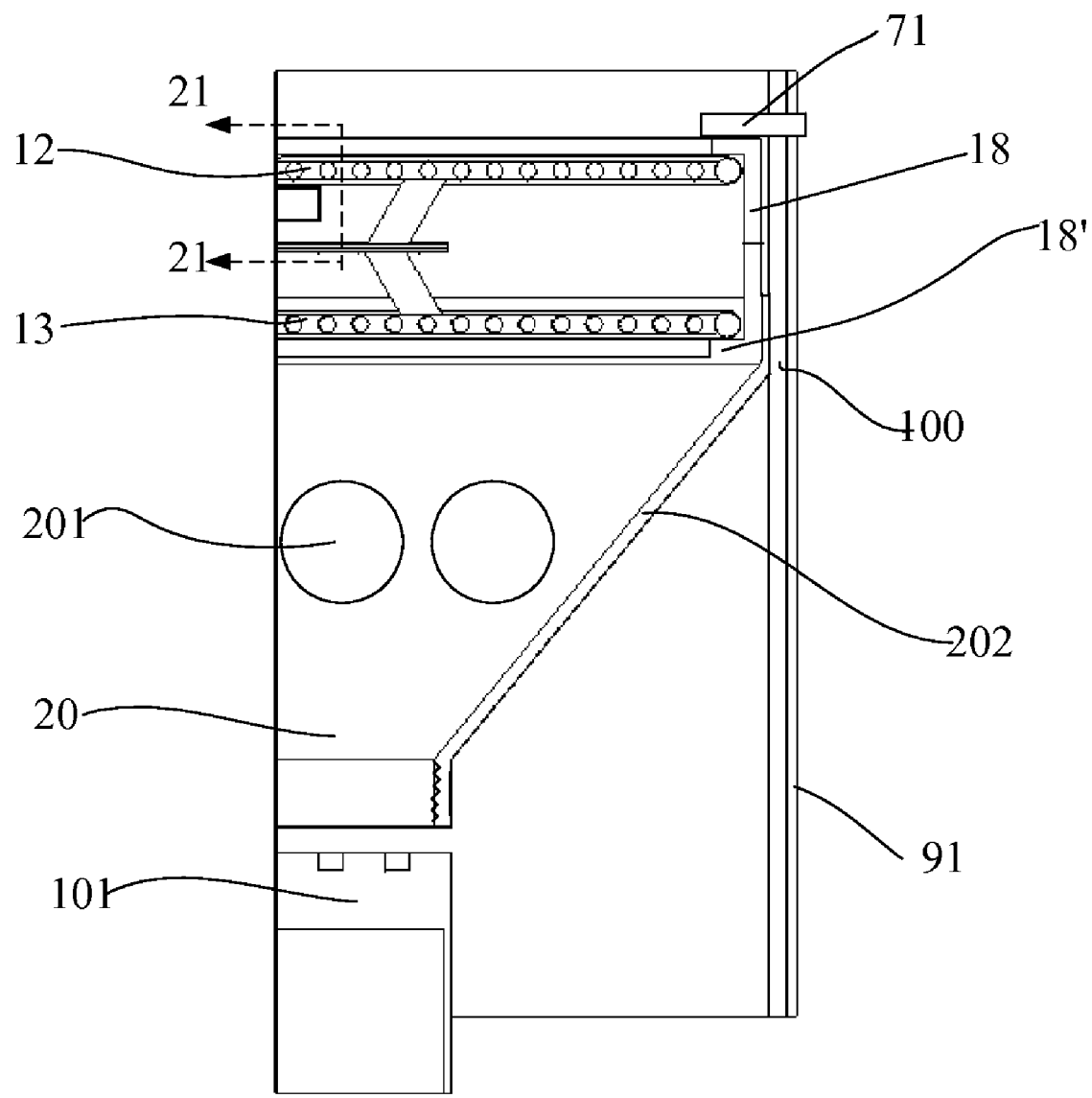
FIG. 3 is a cross-sectional view of Section 61-61 indicated by a dotted line as depicted in FIG. 1.

With reference to FIG. 3 for a cross-sectional view of Section 61-61 indicated by a dotted line as depicted in FIG. 1, the invention uses a metal manufacturing seam welder to manufacture a fire collection opening (20), and internal and external threads are used for connecting and fixing an igniter (101) below, and a fire collection opening (201) is disposed around the periphery to force the air of the air inlet passage (21) to pass through a high temperature area of the flame, and the design of the fire collection opening (201) provides a uniform temperature distribution for the gas in the passage. A molten welding is performed at the contact portion of the fire collection opening periphery (202) and the metal casing (100), such that different planes can be used for fixing the lower insulating ceramic ring (18), and the upper insulating ceramic ring (18') is installed at the top of the upper metal mesh plate after the upper and lower metal mesh plate (12, 13) are fixed into position. At the top of the upper insulating ceramic ring (18'), an insulating ring fixed stopping plate (71) with a screw hole disposed thereon is used for secure the whole core area. In this embodiment, the insulating ring fixed stopping plate (71) is substantially in a square shape, or another geometric shape such as a circular, a triangular or trapezium shape can be used.

Figure 4:
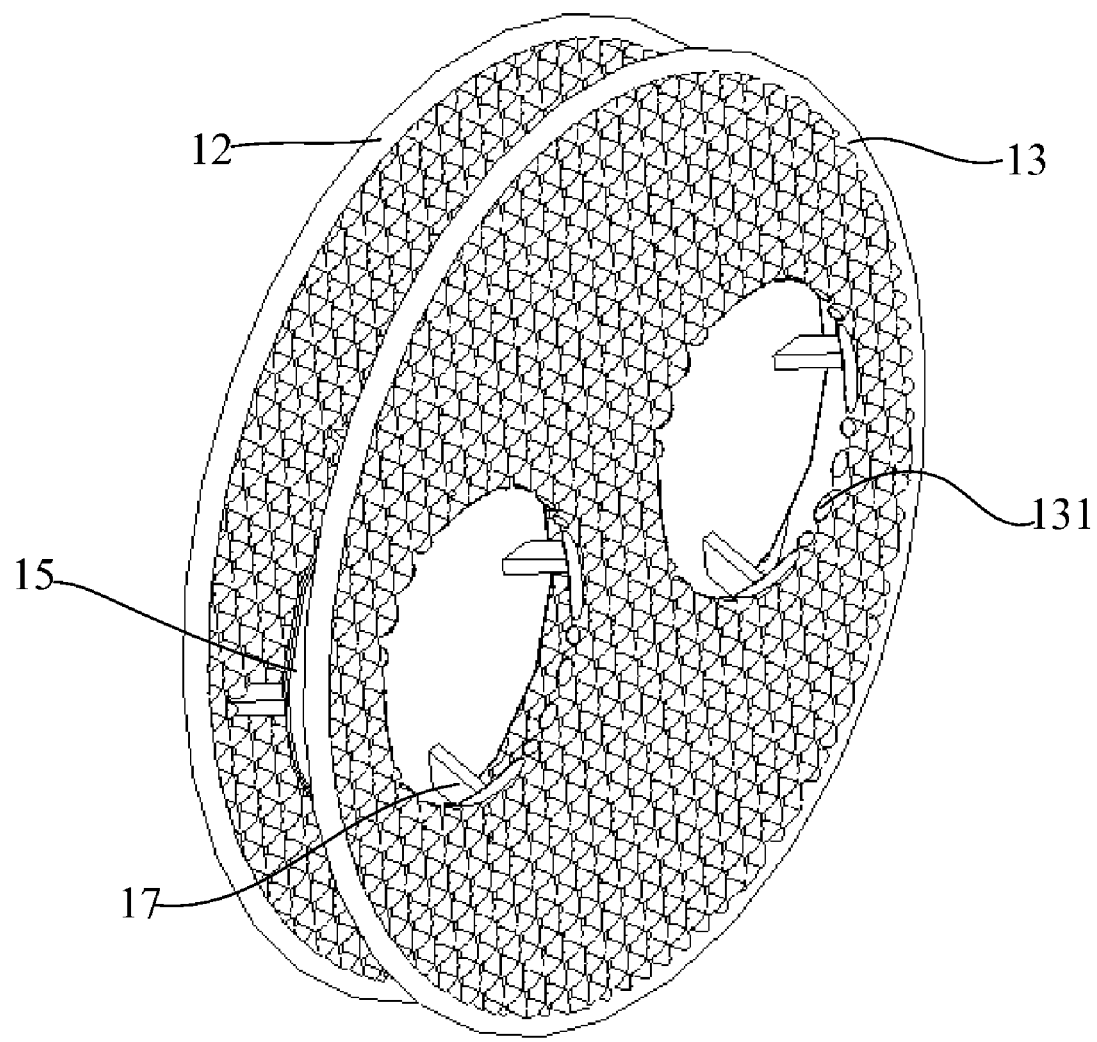
FIG. 4 is a perspective view of a direct combustion solid oxide cell module in accordance with a preferred embodiment of the present invention.

With reference to FIG. 4 for a perspective view of a direct combustion solid oxide fuel cell module in the core area (111) in accordance with the present invention, upper and lower metal mesh plates (12, 13), a film electrode module (15), a current collecting rib (17) and an external circuit are coupled by a common manufacturing method such as a molten welding. In this embodiment, there are two film electrode modules (15), and whose current collecting ribs (17) are contacted with the external surface of the film electrode module (15) by welding, or a plurality of small-area film electrode modules are used to match with the number of flash indentations (131) of the lower metal mesh plate (13) without the need of using a large-area film electrode module. If the cell fails or the film electrode module breaks down due to improper operations or unexpected situations, the cell can be replaced directly. Compared with the prior art that need to replace the whole piece of large-area film electrode module for a repair, the present invention obviously makes a great improvement. The flash indentation (131) of the lower metal mesh plate is in a rectangular, circular, elliptical or any other geometric shape to match the geometric shape of the film cell module, such that the flame below is in a direct contact with the electrode position (16) for driving the anode electrode in a reaction.

Figure 5:
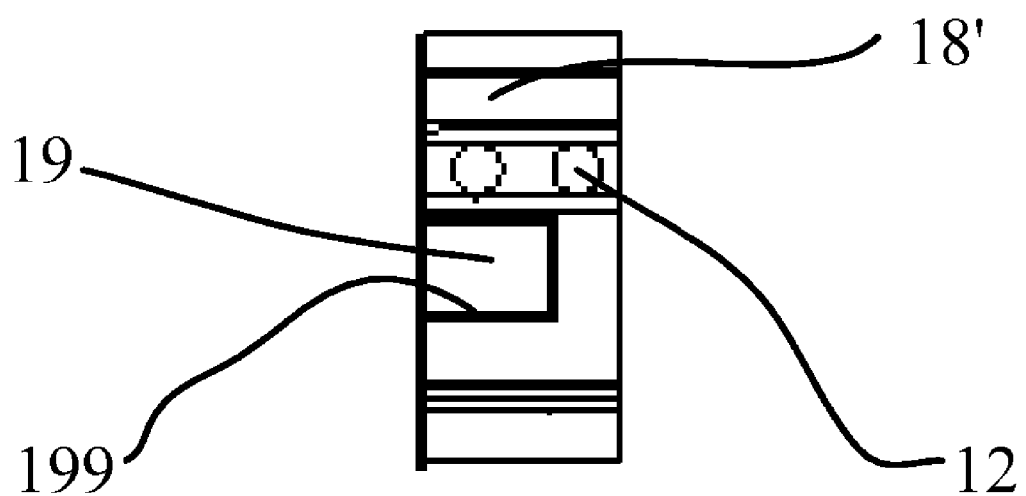
FIG. 5 is a cross-sectional view of Section 21-21 indicated by a dotted line as depicted in FIG. 3.

With reference to FIG. 5 for a cross-sectional view of Section 21-21 indicated by a dotted line as depicted in FIG. 3, the circuit outlet (19') of the cathode terminal shown in the figure is an electric wire passage, and the electric wire passage includes a high temperature resisting ceramic insulating bushing (199) disposed at the internal periphery of the electric wire passage to prevent a short circuit, and whose opening is in a rectangular, circular, elliptical and any other geometric shape matched with the shape of the high temperature resisting ceramic insulating bushing (199).

In summation of the description above, the present invention forms a direct combustion solid oxide fuel cell module by combining a metal sheet and a ceramic material and makes use of the heat-resisting ceramic insulating material to produce the rapid start-up, auxiliary power and air preheating device, and such rapid start-up, auxiliary power, and air preheating device of high temperature fuel cell systems made of a composite material has the advantages of low-cost, easy-to-make, high electric conducting, good heat dissipating, lightweight, short system start-up lag, auxiliary power supply effects. The invention complies with the patent application requirements and is duly filed for patent application.

What is claimed is:

1. A rapid start-up auxiliary power and air preheating device of high temperature fuel cell systems, being a direct combustion solid oxide fuel cell module formed by combining a metal sheet and a heat-resisting ceramic insulating material, and the rapid start-up auxiliary power and air preheating device comprising a peripheral area and a core area, and the core area including the direct combustion solid oxide fuel cell module, an upper metal plate serving as a cell cathode electrode electricity collecting plate, and a lower metal mesh plate serving as a cell anode electrode electricity collecting plate, wherein the lower metal mesh plate including a flash indentation with a size and a position matched with the direct combustion solid oxide fuel cell module disposed above; and a plurality of current collecting ribs disposed at a distal surface in contact with a film electrode module being coupled to the lower metal mesh plate, and two high temperature resisting ceramic insulating rings being disposed around one periphery of the upper metal mesh plate and one periphery of the lower metal mesh plate for preventing a contact between the upper mesh plate and the lower mesh plate metal mesh plates and a metal casing; and the peripheral area including an air passage connected to the core area in the device, an inlet passage, an outlet passage, and an igniter, and the inlet passage being a position for flowing in air, and the outlet passage being connected to a system unit for supplying a high temperature gas.

2. The rapid start-up auxiliary power and air preheating device of the high temperature fuel cell systems as recited in claim 1, further comprising an ignition opening disposed above the igniter and below the core area, and the ignition opening has an internal spiral thread for coupling the igniter, or passing and fixing the igniter by a screw.

3. The rapid start-up auxiliary power and preheating device of the high temperature fuel cell systems as recited in claim 2, wherein a plurality of fire collection openings are disposed around a periphery of the ignition opening.

4. The rapid start-up auxiliary power and air preheating device of the high temperature fuel cell systems as recited in claim 1, further comprising a cathode circuit outlet terminal disposed at an electric wire passage having one cathode electrode on one end of the metal casing proximate to the core area.

5. The rapid start-up auxiliary power and air preheating device of the high temperature fuel cell systems as recited in claim 4, wherein an insulating ring fixed stopping plate is disposed and screwed at a top of an upper insulating ceramic ring installed at a top of the upper metal mesh plate for securing the whole core area.

6. The rapid start-up auxiliary power and air preheating device of the high temperature fuel cell systems as recited in claim 4, wherein a ventilation chamber fixed slippery-resisting plate is disposed above the core area for fixing the ventilation chamber.

7. The rapid start-up auxiliary power and air preheating device of the high temperature fuel cell systems as recited in claim 6, wherein one end of the air passage is in the ventilation chamber and a plurality of air holes are disposed at a distal peripheral portion of the air passage.

8. The rapid start-up auxiliary power and air preheating device of the high temperature fuel cell systems as recited in claim 7, further comprising a heat insulating material covered onto each exposed surface of the metal casing of the device.

* * * * *